United States Patent [19]

Iwata et al.

[11] Patent Number: 4,636,672

[45] Date of Patent: Jan. 13, 1987

[54] SUBMERSIBLE MOTOR

[75] Inventors: Minoru Iwata; Kozo Matake, both of Kanagawa, Japan

[73] Assignee: Ebara Corporation, Tokyo, Japan

[21] Appl. No.: 706,300

[22] Filed: Feb. 27, 1985

[30] Foreign Application Priority Data

Mar. 5, 1984 [JP]  Japan .............................. 59-31543[U]

[51] Int. Cl.4 ............................................. H02K 5/12
[52] U.S. Cl. ......................................... 310/87; 310/90
[58] Field of Search ...................................... 310/87, 90

[56] References Cited

U.S. PATENT DOCUMENTS

| | | | |
|---|---|---|---|
| 3,195,466 | 7/1965 | Young | 310/90 X |
| 4,042,847 | 8/1977 | Jensen | 310/87 |
| 4,421,999 | 12/1983 | Beavers | 310/87 |
| 4,435,661 | 3/1984 | Witten | 310/87 X |
| 4,496,866 | 1/1985 | Yamamoto et al. | 310/87 |

Primary Examiner—Donovan F. Duggan
Attorney, Agent, or Firm—Wenderoth, Lind & Ponack

[57] ABSTRACT

A submersible motor is given a relatively short axial length by arranging a member, at the portion which is on the lower end during use, to serve for transmitting radial torque as well as for transmitting thrust load. By such arrangement, the axial length normally required for the thrust bearing and radial bearing is made shorter.

2 Claims, 2 Drawing Figures

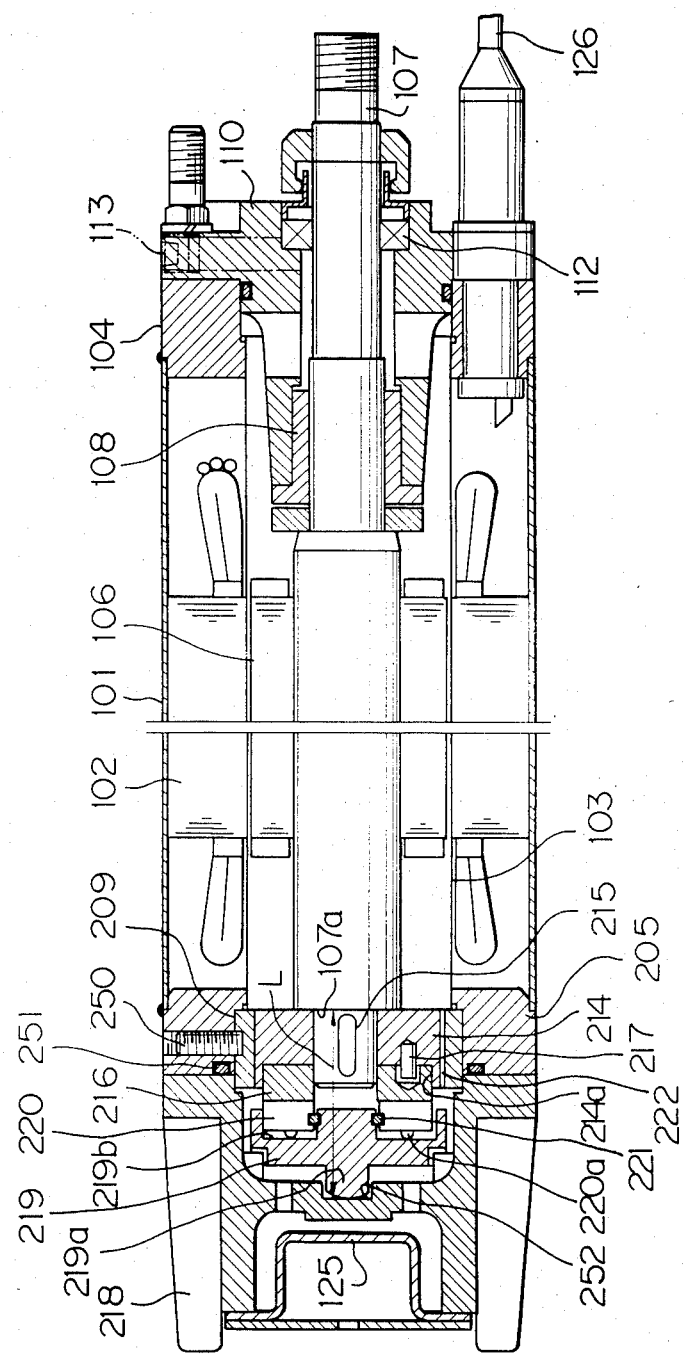

SUBMERSIBLE MOTOR

FIELD OF INVENTION

The present invention relates to a submersible motor and, more particularly, to a submersible motor adapted for use with a submersible pump.

BACKGROUND OF INVENTION

A submersible motor used in conjunction with a submersible pump used as a deep well pump is generally limited in size, particularly with respect to its horizontal sectional area, due to the limited diametral dimension of such deep well. In such application of the motor for a deep well submersible pump, the axial length of the whole submersible-motor deep well pump is made relatively long to provide the required capacity. In this case, the motor is generally disposed in the lowermost position and a pump is attached above the motor through a motor shaft extending upwardly from the motor.

Accordingly, the lowermost portion of the motor shaft is required to be rotatably supported by bearing means with respect to the radial load as well as the thrust load. Therefore, it has been necessary to employ a radial bearing and a thrust bearing independently. Thus, the axial length of the lower bearing portion is also made relatively long because of the dimensional limitation with regard to the diameter of the motor.

It has been desired to have a submersible motor having a shortened axial length without enlarging the lateral diameter of the motor housing.

SUMMARY OF INVENTION

Thus, it is an object of the present invention to provide a submersible motor having a shortened axial length without enlarging the outer diameter of the motor.

The above object is achieved by the present invention wherein the axial length of a lower radial bearing means is devised to be within the axial length of the thrust bearing means. More particularly, a thrust disk secured to the motor shaft at the lower portion thereof is utilized as a journal portion of the motor shaft which bears against the bearing surface of the metal bearing serving as a radial bearing which may be made with a relatively large diameter having a relatively short axial length. Therefore, at the lower portion of the motor opposite the upper portion where a pump is to be coupled to the motor shaft, at least a portion of the thrust disk constituting a part of the thrust bearing means is able to be disposed within the portion corresponding to the radial bearing means whereby the axial length of the combined radial and thrust bearing means is made relatively shorter, which contributes to shortening of the overall axial dimension of the motor.

The present invention will be explained with reference to the accompanying drawings a brief explanation of whichis summarized below.

BRIEF EXPLANATION OF DRAWINGS

FIG. 2 shows a longitudinal cross section of a submersible motor according to the present invention.

DETAILED DESCRIPTION OF PREFERRED EMBODIMENTS

Figure 1:
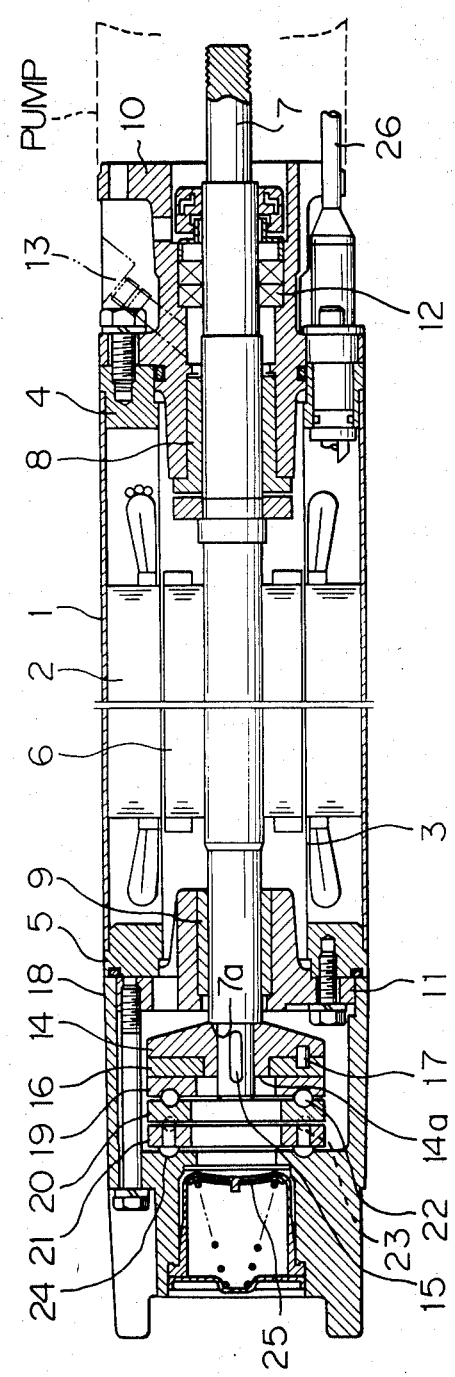
FIG. 1 shows a conventional submersible motor in longitudinal cross section.

Before explaining a preferred embodiment according to the present invention, the construction of a conventional submersible motor will be explained with reference to FIG. 1.

In FIG. 1, a cross sectional view of the coventional prior art submersible motor is shown wherein the longitudinal axis thereof, which is usually vertical in use, is shown in a horizontal direction for the purpose of illustration and its upper side is on the right hand side in FIG. 1.

The submersible motor illustrated is of a canned type and comprises a cylindrical frame 1 within which a stator 2 is housed and sealed within a stator can 3 made of sheet metal. At an upper end and a lower end of the frame 1, an upper side plate 4 and a lower side plate 5 are press fitted into the frame, respectively. The upper and lower ends of the can 3 are sealed to the upper side plate 4 and the lower side plate 5, respectively by such means as welding. At the axial center of the frame 1, a rotor 6 is disposed in opposing relation to the stator 2 by being mounted on a motor shaft 7 and the outer cylindrical surface of the rotor and the inner cylindrical surface are arranged to have a small gap therebetween. The motor shaft 7 is rotatably supported by an upper radial metal bearing 8 and a lower radial metal bearing 9 which are stationarily installed in an upper bracket 10 and a lower bracket 11, respectively. The upper and lower brackets 10 and 11 are sealingly secured by fastening means such as bolts to the upper side plate 4, and the lower side plate 5, respectively with sealing means therebetween. The upper portion of the motor shaft 7 is sealed by a mechanical seal 12 above which further protecting means such as sand-slingers, etc., are provided. The lower side of the motor is also sealed as will be explained later. The inside of the frame is filled with liquid through a port 13, this liquid serving to lubricate the bearings.

At the lower end of the motor shaft 7, a thrust disk 14 is attached to the shaft through a key 15 and is adapted to abut against a step portion 7a of the motor shaft 7 so that the thrust is transmitted to the disk 14. The thrust disk 14 is provided with a center portion 14a circularly raised in the downward direction and an annular flat disk 16 is disposed around the center portion 14a. In order to transmit torque to the annular disk 16, a pin 17 is press fitted into the thrust disk 14 and the opposite end of the pin 17 is loosely received in a hole provided in the annular disk 16.

A thrust housing 18 is also secured to the lower bracket 11 by fastening means such as bolts with sealing means therebetween.

A thrust pad 19 is concentrically disposed relative to the annular disk 16 in abutting relation to the disk 16. The thrust disk 14, annular disk 16 and thrust pad 19 are suspended in the thrust housing 18 by a first self-aligning annular collar 20 and a second self-aligning annular collar 21 with interposed diametrally arranged balls 22 between the thrust pad 19 and the first annular collar 20, another group of diametrally arranged balls 23 interposed between the first and second self-aligning annular collars 20 and 21 and diametrally arranged studs 24 mounted on the second annular collar 21 and having spherical heads between the second annular collar 21 and the inner bottom of the thrust housing 18, the diametral arrangements of balls 22 and 23 being orthogonal with each other and the diametral arrangements of the balls 23 and the studs 24 also being orthogonal with each other. Under the thrust housing 18, a diaphragm chamber including a diaphragm 25 is provided so as to accommodate variation in the volume of liquid contained within the motor casing 1.

The submersible motor is adapted to be coupled to a submersible pump (as schematically shown by dotted lines on the right hand side of FIG. 1) at the upper end of the motor shaft 7 and electric power is supplied to the stator 2 through a cable 26 connected to the motor at the upper bracket 10 through a liquid-proof connector.

As explained above, at the lower portion of the prior art submersible motor, bearing means for supporting the motor shaft generally comprises a thrust bearing means in addition to a radial bearing means and these two bearing means are arranged in adjacent relation along the axial direction of the shaft. Therefore, the required axial length for accommodating such bearing means is increased, whereby the overall length of the motor becomes lengthy and the weight thereof is also increased. In order to shorten the length of the motor, it had previously been proposed that bearing means be installed in the space within the stator can; however such an attempt was revealed as unsatisfactory because of the presence of a magnetic field which causes abraded particles to be attracted to the bearing means. Further, bearing means and the coil of the stator become sources for generating heat during the operation and it is not desirable to have such heat sources occurring at almost the same portion. Accordingly, it has been desired to have a submersible pump directed to the objects explained hereinbefore which is free from the drawbacks discussed above.

Reference is made to FIG. 2 wherein an embodiment according to the present invention is illustrated. In this drawing, those portions which are similar to those in FIG. 1 are given the same reference numerals with the addition of "100" thereto, in each case. Those portions not specifically explained hereinafter with reference to such reference numerals are to be understood by referring to those explained in connection with FIG. 1.

At a lower side plate 205, a radial metal bearing 209 having an inner diameter almost equivalent to the inner diameter of the stator can 103 is fitted thereinto and stationarily held in place by means of a set screw 250. The lower side of the radial metal bearing 209 projects slightly in the downward direction and is received in a thrust housing 218 with a seal 251 disposed at the juncture of the housing 218, lower side plate 204 and the metal bearing 209. The housing 218 is also fastened to the cylindrical frame 101 and the lower side plate 205 by a suitable fastening means.

At the lower end of the motor shaft 107 where the diameter thereof is reduced, a thrust disk 214 is installed with a key 215 disposed therebetween so as to rotate with the shaft 107 and it receives the thrust via a shoulder portion 107a of the shaft. The radially outer peripheral portion of the thrust disk 214 is made as a cylindrical surface adapted to transmit the radial load of the shaft to the metal bearing 209. Since the inner diameter of the metal bearing 209 is made relatively large, enough bearing surface area is provided for the radial load even though the axial length of the metal bearing 209 is made shorter. The under side of the metal bearing 209 is concentrically bored to provide a recessed seat 214a designed to receive an annular thrust carbon plate 216 therein. A pin 217 is mounted at one end thereof on the thrust disk 214 and the opposite end is received in a blind hole on the carbon plate 216 such as to rotate the plate 216 with the thrust disk 214. At an inner bottom surface 252 of the thrust housing 218, a spherical projection end 219a of a leveling disk 219 is received and, within an annular groove 219b provided on the upper surface of the leveling disk 219 several tilting pads 220 (for example, three to six in number) are disposed so that the respective upper surfaces of the tilting pads 220 make sliding contact with the lower surface of the thrust carbon plate 216. Each of the tilting pads 220 is respectively provided with a downwardly directed projection 220a, so that the tilting pads 220 are tiltable so as to provide proper sliding contact relative to the carbon plate 216. An "0" ring 221 installed between the leveling disk 219 and the tilting pads 220 serves to maintain the tilting pads 220 in place by engaging the grooves in both the leveling disk 219 and tilting pads 220 irrespective of the posture of the leveling disk 219.

Upon energization of the stator through a cable 126, the motor shaft 107 rotates and thus the thrust disk 214 is rotated together with the thrust carbon plate 216 so that the radial load is borne by means of the radial metal bearings 108 and 209 and the thrust load is borne by the carbon plate 216 and tilting pads 220. In order to allow the lubricating liquid to lubricate and move through the metal bearing 209, grooves 222 are axially provided on the inner surface of the metal bearing 209, one of which is shown in FIG. 2.

In the illustration shown in FIG. 2, the thrust carbon plate 216 extends outside the recessed seat 214a; however, the depth of the recessed seat 214a may be made deeper so that the thrust carbon plate 216 can be received completely within the recessed depth of the seat 214a. Further, the depth of the seat may be made even deeper to receive the tilting pads 220 therein. As explained above, one of the radial bearings supporting the shaft, especially the lower side radial bearing, is able to be disposed within the axial length "L" of the thrust bearing means by reason of the provision of the recessed seat 214a into which at least some components of the thrust bearing means are received. Accordingly, the total length of the submersible motor is made shorter by the axial dimension of the radial bearings heretofore required. Further advantages according to the present invention are seen in the following points.

Since the radial bearing means is disposed within the lower side plate in the embodiment (FIG. 2), a lower bracket such as the bracket 11 for supporting the radial bearing 9 (FIG. 1) is made unnecessary whereby the number of components is reduced and preferred separation of bearing means from the stator coil is easily achieved because of the fact that provision of a space in the axial direction for the radial bearings is made unnecessary.

The arrangement of the thrust housing 218 for accommodating part of the axial length of the radial metal bearing simplifies the design of the motor frame and thrust housing, etc.

The present invention has been explained in detail by referring to the preferred embodiment. However, it should be noted that the present invention is not limited to the explanation given above and it may be modified or changed by those skilled in the art within the sprit and scope of the present invention which is defined by the claims appended hereto.

What is claimed is:

1. A submersible motor having a motor shaft extending outwardly at one end in the axial direction thereof for transmitting torque to a submersible apparatus to be driven by the motor, and a thrust housing at the opposite end of said motor, a thrust bearing means encased in said thrust housing for bearing the thrust load through said shaft, said thrust bearing means having a thrust disk secured to said shaft at the opposite end of said motor, a radial metal bearing surrounding the periphery of said thrust disk and within which said thrust disk is journalled for rotation in radial bearing relationship with said radial metal bearing, and the surface of said thrust disk facing toward said opposite end having an axially extending recess opening out of said thrust disk toward said opposite end, and thrust bearing elements in said recess between said thrust disk and said thrust housing for bearing the thrust load on said shaft.

2. A submersible motor as claimed in claim 1 in which a portion of the outer peripheral surface of said radial bearing constitutes a mating portion with which said thrust housing is engaged and secured.

* * * * *